K. E. PEILER.
GUM MELTING MACHINE.
APPLICATION FILED SEPT. 8, 1916.

1,262,246.

Patented Apr. 9, 1918.
3 SHEETS—SHEET 1.

Inventor:
Karl E. Peiler
by Harry R. Williams
Atty.

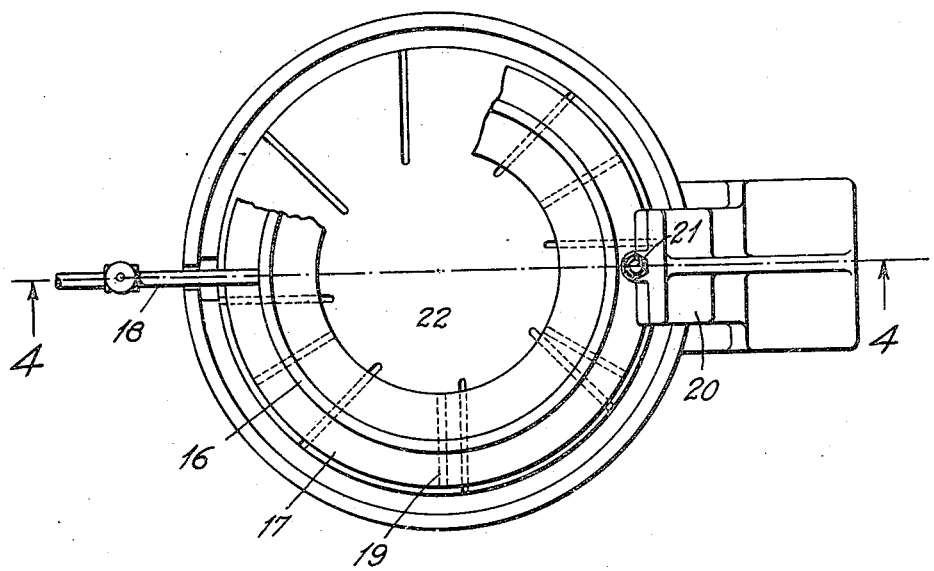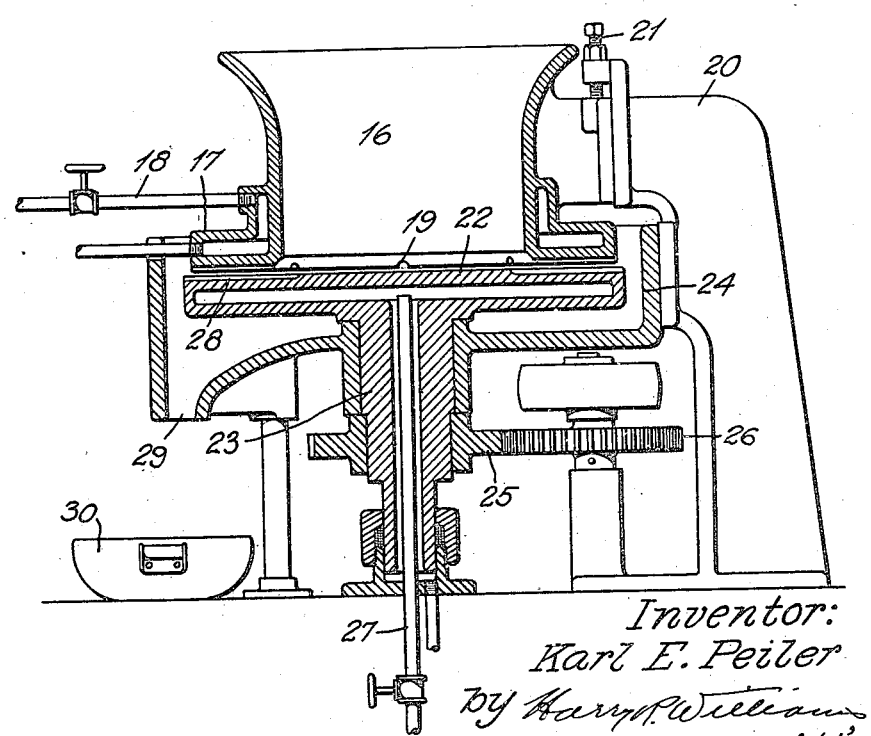

K. E. PEILER.
GUM MELTING MACHINE.
APPLICATION FILED SEPT. 8, 1916.

1,262,246.

Patented Apr. 9, 1918.
3 SHEETS—SHEET 3.

Inventor:
Karl E. Peiler
by Harry R. Williams,
Atty.

UNITED STATES PATENT OFFICE.

KARL E. PEILER, OF HARTFORD, CONNECTICUT, ASSIGNOR OF SIX-NINTHS TO BEECH-NUT PACKING COMPANY, OF CANAJOHARIE, NEW YORK, A CORPORATION OF NEW YORK, AND TWO-NINTHS TO WILLIAM A. LORENZ AND ONE-NINTH TO KARL E. PEILER, BOTH OF HARTFORD, CONNECTICUT.

GUM-MELTING MACHINE.

1,262,246.      Specification of Letters Patent.      Patented Apr. 9, 1918.

Application filed September 8, 1916. Serial No. 119,032.

*To all whom it may concern:*

Be it known that I, KARL E. PEILER, a citizen of the United States, residing at Hartford, in the county of Hartford and State of Connecticut, have invented a new and useful Improvement in Gum-Melting Machines, of which the following is a specification.

This invention relates to the class of machines which are provided for rendering fluid solidified gums.

The object of the invention is to produce an efficient machine of this class which will transform hard pieces of gum that contain solid foreign substances into a viscous mass and deliver it in condition for further manipulation without deleteriously affecting the quality of the gum.

The conception is particularly valuable when used in connection with the preparation of chicle for the manufacture of chewing gum. Commercial raw chicle comes in a lumpy or granular condition mixed with more or less bark and other foreign substances, and is usually melted in order to free and permit the removal of the objectionable matter. Chicle, however, cannot be reduced to a perfect fluid without injuring the desirable qualities of the gum. Machines which embody this invention, therefore, have means for melting the gum and reducing it to a semi-fluid state without liquefying it, and at the same time grinding it to hasten the reduction of the gum and disintegration of the bark and other foreign substances, these means being arranged so that the product will be continuously delivered as a viscous mass of uniform texture and fluidity.

Figure 1:
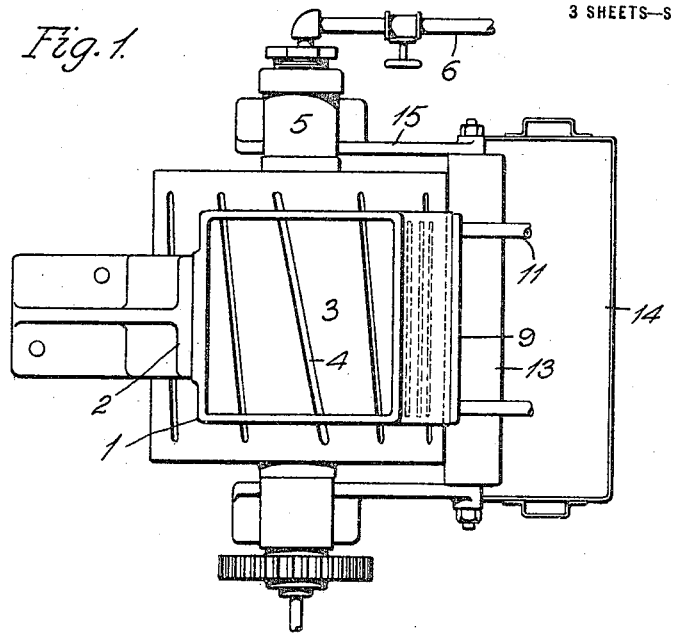
Figure 2:
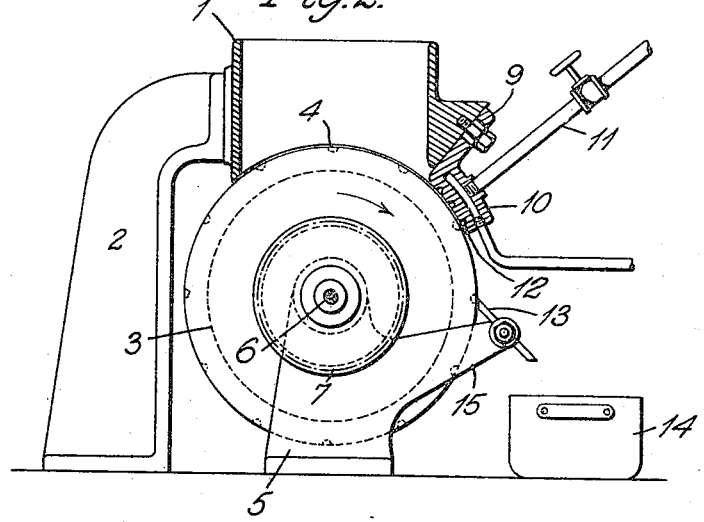
Figure 5:
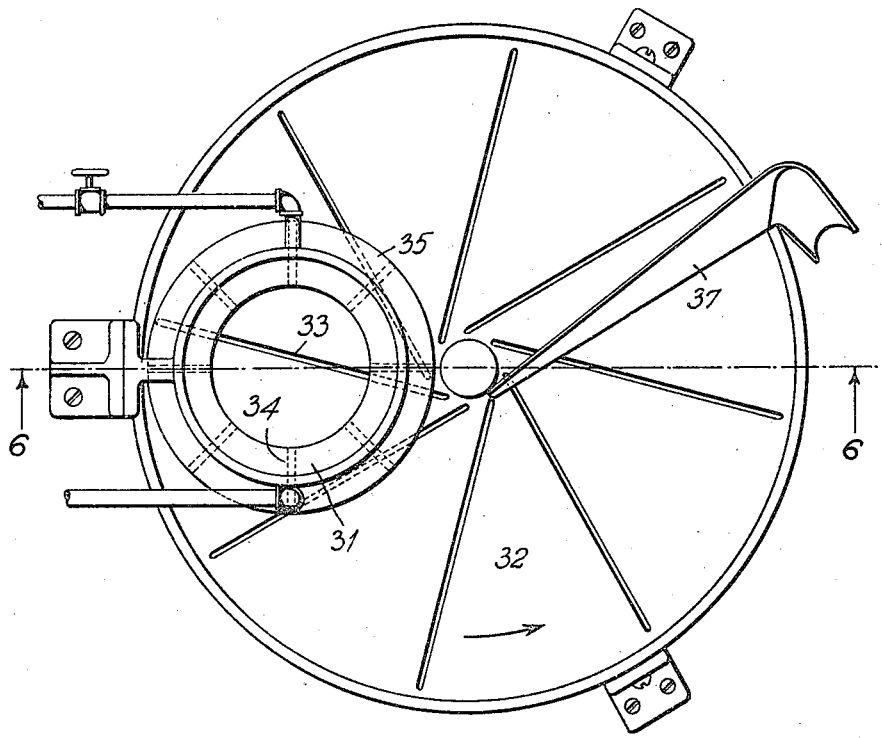
Figure 6:
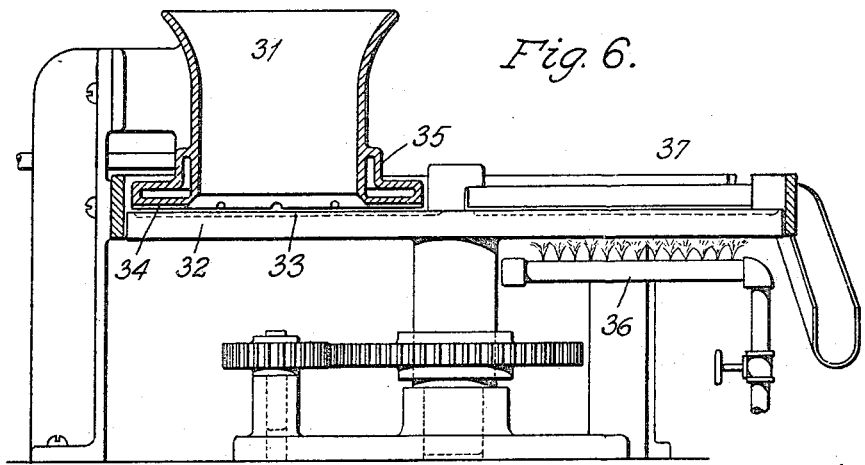

Figure 1 of the accompanying drawings shows a plan of a simple form of machine which embodies this invention. Fig. 2 shows a vertical section of the same. Fig. 3 shows a plan of a modified form of machine. Fig. 4 shows a vertical section of the modified form on plane indicated by the dotted line 4—4 on Fig. 3. Fig. 5 shows a plan of another modification. Fig. 6 shows a vertical section of the latter modification on plane indicated by the dotted line 6—6 on Fig. 5.

In this machine there is a hopper designed to receive the solid particles of gum to be reduced, means made a part of or attached to the walls of the hopper which provides one of the grinding surfaces, and a heated movable member having a surface that forms the bottom of the hopper and the complementary grinding surface, which movable heated surface by reason of friction and the heat radiated therefrom quickly softens the gum with which it comes in contact and carries it together with the foreign substances past the disintegrating means with which the heated movable bottom of the hopper coöperates to disintegrate the solid matter.

In the first style of machine illustrated the hopper 1 is supported by a standard 2. In this case the bottom of the hopper is formed by a hollow cylinder 3 which has cutting grooves 4 (preferably arranged oblique to the axis) in its peripheral surface. The journals of the cylinder are mounted in bearings in brackets 5 and they are hollow so that steam may be admitted from the pipe 6 to the interior of the cylinder for heating it. Means, such as the gear 7, is fixed to the cylinder shaft so that the cylinder may be rotated from any suitable driving mechanism.

Adjustably attached by bolts 8 to one side of the hopper is an angle plate 9. The lower section 10 of this plate is desirably hollow so that steam may be admitted for heating it through the pipe 11, and the underside of this section is provided with cutting grooves 12. This plate is adjusted so that the opening from the hopper between the cylinder and the bottom of the plate will be just sufficient to permit the passage of the required amount of matter as the cylinder rotates and so that in coöperation with the surface of the cylinder it will grind up such solid matter as attempts to pass out with the melted gum between the cylinder and the grinding gage plate.

A scraping plate 13 is arranged with its edge adjacent to the surface of the cylinder below the gage plate for removing the viscous mass from the cylinder and directing it into the receiving receptacle 14. This scraper is shown as mounted on arms 15 that extend out from the cylinder supporting brackets.

In the form of machine illustrated in Figs. 3 and 4 the hopper 16 has a flange 17 extending around its lower edge. This flange is shown as hollow so that it may receive steam from the pipe 18 and on its under face it is provided with radiating cutting grooves 19. The hopper is illustrated as being adjustably fastened in a way on the front face of the standard 20 by means of the screw 21 so that the hopper may be raised and lowered as desired. The bottom of this hopper is closed by a hollow disk or cylinder 22. This cylinder is supported so that it will rotate in a horizontal plane, its hub 23 being held in a vertical bearing in the casing 24 and being provided with a pinion 25 that is engaged by a driving gear 26. The cylinder and its hub are hollow so that steam may be admitted from the pipe 27, and the top surface of the cylinder is provided with cutting grooves 28.

The casing 24 is made in the form of a receptacle surrounding the lower end of the hopper and the cylinder so as to receive the mass that is melted by the abrasion of the hot top face of the rotating cylinder and that is ground up as it passes between the grinding flange around the bottom of the hopper and the cylinder. Beneath the outlet 29 from the receptacle is a receiver 30 for the viscous mass that is deposited in the receptacle by the rotation of the cylinder.

The hopper 31 of the form of machine illustrated in Figs. 5 and 6 is located at one side of the axis of the horizontally rotating disk 32 which forms the bottom of the hopper. This disk in its upper surface has cutting grooves 33 that coöperate with grooves 34 in the underside of the hollow flange 35 that projects from around the edge of the hopper, for grinding the solid matter. In this case the disk is shown as heated by gas from the pipe 36. A scraper 37 is arranged over the top of the disk to remove and conduct off to one side the viscous mass that is brought around by the rotation of the disk.

With such mechanisms as described the gum is softened very quickly by the rotating heated surface at the bottom of the hopper and is rapidly removed without heating it sufficiently hot to affect its quality, and the bark and other impurities are ground up and left in such condition that they can subsequently be easily removed.

The invention claimed is:

1. A gum melting machine having a hopper for receiving the gum, a movable plate having a cutting surface forming the bottom of the hopper, means for moving said surface under the bottom of the hopper, means for heating said movable surface, and means having a cutting surface coöperating with the cutting surface of the movable member for disintegrating the solid matter brought out with the molten gum.

2. A gum melting machine having a hopper for receiving the gum, a movable member having a cutting surface forming the bottom of the hopper, means for moving said surface under the bottom of the hopper, means for heating said movable surface, and a relatively fixed member having a cutting surface that coöperates with the cutting surface of the movable member for disintegrating solid matter brought out with the molten gum.

3. A gum melting machine having a hopper for receiving the gum, a movable member having a cutting surface forming the bottom of the hopper, means for moving said surface under the bottom of the hopper, means for heating said movable surface, and adjustable means having a cutting surface coöperating with the cutting surface of the movable member for disintegrating the solid matter brought out with the molten gum.

4. A gum melting machine having a hopper for receiving the gum, a cylinder having cutting grooves forming the bottom of the hopper, means for rotating the cylinder under the bottom of the hopper, means for heating the cylinder, and means having cutting grooves coöperating with the cutting grooves of the cylinder for disintegrating the solid matter brought out with the molten gum.

5. A gum melting machine having a hopper for receiving the gum, a hollow cylinder having cutting grooves forming the bottom of the hopper, means for rotating the cylinder under the bottom of the hopper, means for admitting heating fluid to the interior of the cylinder, and means having cutting grooves coöperating with the cutting grooves of the cylinder for disintegrating the solid matter brought out with the molten gum.

6. A gum melting machine having a hopper for receiving the gum, a hollow cylinder having cutting grooves forming the bottom of the hopper, means for rotating the cylinder under the bottom of the hopper, means for admitting heating fluid to the interior of the cylinder, means having cutting grooves coöperating with the grooves of the cylinder for disintegrating the solid matter brought out with the molten gum, and means for heating said disintegrating means.

7. A gum melting machine having a hopper for receiving the gum, a disintegrating member attached to the hopper, a member having a cutting surface movable adjacent to the open end of the hopper and said disintegrating member, means for moving said movable member, and means for heating said movable member.

8. A gum melting machine having a hopper for receiving the gum, a disintegrating member attached to the hopper, means for heating said disintegrating member, a member having a cutting surface movable adjacent to the open end of the hopper and said disintegrating member, means for moving said movable member, and means for heating said movable member.

9. A gum melting machine having a hopper for receiving the gum, a movable member having a cutting surface extending across the opening through the hopper, means for moving said surface across said opening, means for heating said movable surface, and means having a cutting surface coöperating with the cutting surface of the movable member for disintegrating the solid matter brought out with the molten gum.

10. A gum melting machine having a hopper for receiving the gum, a movable member having a cutting surface extending across the opening through the hopper, means for moving said surface across said opening, means for heating said movable surface, means having a cutting surface coöperating with the cutting surface of the movable member for disintegrating the solid matter brought out with the molten gum, and means for removing the viscous mass from the movable member.

11. The method of treating gum containing non-plastic particles, which consists in engaging the gum with a hot moving cutting surface and simultaneously melting the gum so as to release the non-plastic particles and cutting the non-plastic particles contained in the melted gum, by the action of the hot moving cutting surface.

KARL E. PEILER.

Copies of this patent may be obtained for five cents each, by addressing the "Commissioner of Patents, Washington, D. C."